July 31, 1951  F. TRAIBER  2,562,588
FILM PROCESSING EQUIPMENT
Filed July 20, 1949

INVENTOR.
FRANK TRAIBER
BY
*Gustav A. Wolff*
ATT.

Patented July 31, 1951

2,562,588

UNITED STATES PATENT OFFICE 2,562,588

FILM PROCESSING EQUIPMENT

Frank Traiber, Lakewood, Ohio

Application July 20, 1949, Serial No. 105,814

1 Claim. (Cl. 95—96)

This invention relats in general to film or photographic plate processing equipment, and more particularly, to equipment of this type adapted to control the temperature of developing, hardening and fixing solutions arranged in processing tanks such as used in processing films and photographic plates, the temperature control of such processing solutions being highly important to obtain satisfactory, speedy processing results.

The primary object of the present invention is the provision of a simple and practical device adapted to control the temperature of film or photographic plate processing solutions in their processing tanks in an economical and simple manner, the device embodying a subdivided container including a washing compartment and a processing-solution-storing compartment, the washing compartment being supplied with wash water through an inlet connected to a source of temperature controlled water, and such wash water being discharged from said washing compartment through an outlet or overflow connecting the washing compartment with the other compartment to permit heat exchange between the used wash water and processing tanks containing the processing liquids and arranged in the storing compartment, the water level of which is controlled by an overflow or outlet.

Another object of the invention is the provision of a container of the type referred to above in which the water level controlled by the overflow or outlet of the washing compartment is arranged at a higher level than the water level in the processing tank storing compartment to prevent contamination of the wash water in the washing compartment by wash water backed up from the tank storing compartment.

Further objects and novel features of construction, combination and relation of parts by which the objects in view have been attained, will appear and are set forth in detail in the course of the following specification. The drawing accompanying and forming part of the specification illustrates a certain practical embodiment of the invention, but it will be apparent as the specification proceeds that the structure may be modified and changed in various ways without departure from the true spirit and broad scope of the invention.

Figure 1:
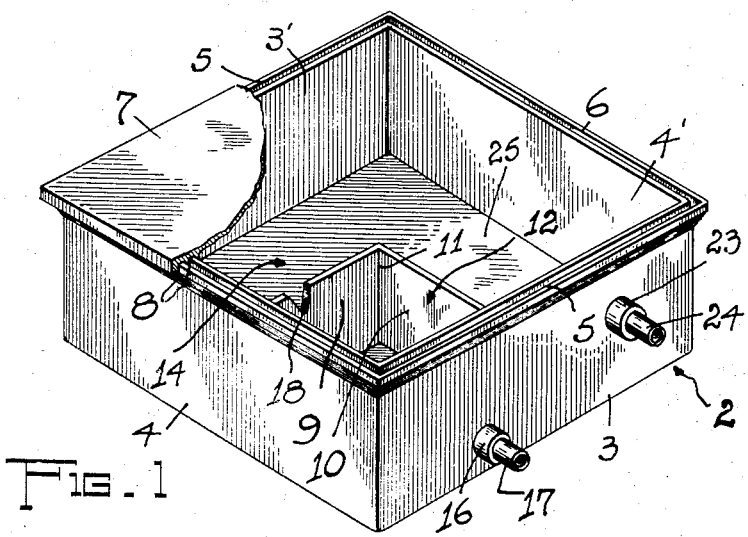
Fig. 1 is a perspective view of a device constructed in accordance with the invention.
Figure 3:
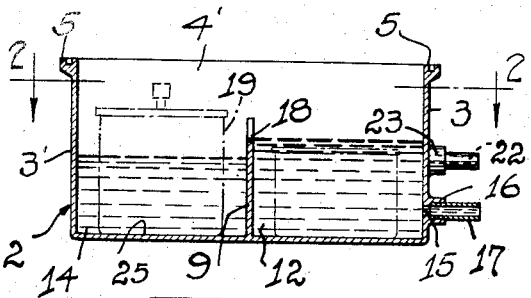
Fig. 3 is a vertical section through the device, taken on line 3—3 of Fig. 2.
Figure 2:
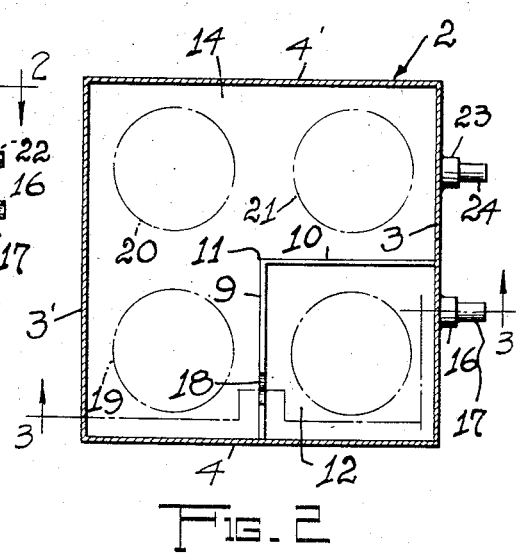
Fig. 2 is a horizontal cross section through the device shown in Fig. 1, the section being taken on line 2—2 of Fig. 3.
Figure 4:
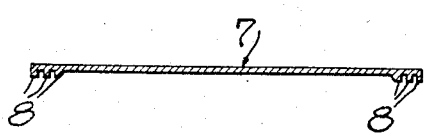
Fig. 4 is a sectional view through the cover member of the device.

Referring now more in detail to the exemplified form of the invention shown in the drawing, reference numeral 2 denotes a rectangularly-shaped, tank-like open container, the side walls 3, 3' and 4, 4' of which are reinforced and grooved at their upper edges at 5 and 6 to light-tightly seat a cover member 7 which is provided with parallel ridges 8 to light-tightly seat the cover member on the container when resting thereon. Container 2 includes two inner walls 9 and 10 which extend at right angles from side walls 3 and 4 and are fluid-tightly sealed to each other at 11 to subdivide container 2 into two compartments, washing compartment 12 and a processing-tank storing compartment 14 substantially larger than the first compartment.

The side wall 3 has in its portion opposite washing compartment 12 an inlet opening 15 which is formed in a boss 16 mounting a pipe nipple 17 to facilitate proper connection of inlet opening 15 with a source of temperature-controlled water supply (not shown). The washing compartment has its water level controlled by a V-shaped slot or overflow passage 18 arranged in the top of inner wall 9, which V-shaped slot acts as overflow and guides the used wash water from washing compartment 12 into the processing-tank storing compartment 14 storing in processing operations processing tanks 19, 20 and 21 which contain the films to be processed and developing, hardening and fixing solutions used in film processing operations. The tank storing compartment 14 has an outlet passage 22 extending through a boss 23 on side wall 3, which boss mounts a nipple 24 to facilitate discharge of water from compartment 14. The height of outlet passage 22 above the bottom 25 of container 2 is less than the height of overflow passage 18 from said bottom to differentiate the water levels in said two compartments and prevent backing up of contaminated water from compartment 14 through overflow passage 18 into the washing compartment 12.

The described device permits proper temperature control of film or photographic plate processing operations through all their steps including developing, hardening, fixing and washing. Temperature control is effected by temperature-controlled wash water fed from a source of supply into the washing compartment, feeding of the used wash water from the washing compartment into the processing-tank storing compartment for heat exchange with the processing tanks stored therein, and discharging of such water from the processing-tank storing compartment to a waste line. Contamination of the wash water in the washing compartment by water backed up from the processing-tank storing compartment is positively prevented by providing the washing compartment with a water level positioned above the water level in the processing-tank storing compartment.

Having thus described my invention, what I claim is:

A unitary article of manufacture for processing film or photographic plate at a predetermined temperature comprising a rectangular open tank, an angularly shaped partition wall in said tank secured at right angles to the inner faces of adjacent walls of said tank, subdividing same into a small rectangular compartment and a substantially larger L-shaped compartment partly encircling the rectangular compartment, an inlet passage for said small compartment arranged near the bottom of one of the said adjacent walls of said tank in an area opposite the said rectangular compartment, an overflow for said small compartment arranged in the said angularly shaped partition wall opposite said inlet passage to effect open communication of said small compartment with the L-shaped compartment, and an outlet passage for said L-shaped compartment arranged in one of said adjacent walls of said open tank at a height below the overflow of said small compartment to differentiate the water levels of said two compartments when filled with water and prevent flow of water from said large L-shaped compartment to said small rectangular compartment.

FRANK TRAIBER.

REFERENCES CITED

The following references are of record in the file of this patent:

UNITED STATES PATENTS

| Number | Name | Date |
|---|---|---|
| 1,651,454 | Hayes | Dec. 6, 1927 |
| 1,810,790 | Riggle | June 16, 1931 |
| 2,440,314 | Turner | Apr. 27, 1948 |

FOREIGN PATENTS

| Number | Country | Date |
|---|---|---|
| 712,280 | France | July 20, 1931 |